April 23, 1957

V. K. ELORANTA 2,789,488

PHOTOGRAPHIC APPARATUS, INCLUDING FLUID-SPREADING
AND SHEET-ARRESTING MECHANISM

Filed Nov. 1, 1955

INVENTOR.
Vaito K. Eloranta
BY Brown and Mikulka
and
Robert E. Corb
ATTORNEYS

United States Patent Office 2,789,488
Patented Apr. 23, 1957

2,789,488

PHOTOGRAPHIC APPARATUS, INCLUDING FLUID-SPREADING AND SHEET-ARRESTING MECHANISM

Vaito K. Eloranta, Needham, Mass., assignor to Polaroid Corporation, Cambridge, Mass., a corporation of Delaware Application November 1, 1955, Serial No. 544,182

21 Claims. (Cl. 95—13)

This invention relates to photography and more particularly to photographic apparatus for distributing a fluid between a pair of superposed sheets.

It has been proposed to effect a variety of photographic processes by distributing a fluid in a uniformly thin layer between a pair of superposed sheets. For example, a photosensitive stratum on one of the sheets may be developed by a processing fluid spread between it and another sheet. The fluid is spread from a container supported on one of the sheets and located therebetween, and the spreading of the fluid is preferably accomplished by moving the superposed sheets through a narrow gap between a pair of rigid members fixed with respect to one another so as to cause hydraulic pressure to be generated in the fluid between the sheets. The gap between the rigid members is usually equal to or slightly greater than the combined thicknesses of the two sheets and the layer of fluid spread therebetween, and consequently does not allow for the passage of the sheets in the region of a container due to the added thickness of the material comprising the container.

The present invention has for one of its objects the provision of a novel device for spreading a fluid in a uniformly thin layer from a container between a pair of superposed sheets, the fluid-spreading device comprising a pair of rigid members adapted automatically to form a gap of predetermined fixed width sufficient to permit the movement of a fluid-carrying container, secured between a pair of superposed sheets, between said members so as to cause the discharge of the fluid contents of said container between said sheets, and, as the container moves from between said members, to form a gap of lesser predetermined fixed width adapted to cause the spreading of said fluid between said sheets during movement of said sheets between said members.

The fluid-spreading device of the invention may be incorporated into photographic apparatus such as a camera of the type disclosed in copending application Serial No. 537,982, filed October 3, 1955, in the name of Edwin H. Land. In this type of camera a photosensitive sheet and a second sheet supporting a rupturable fluid-filled container are introduced through a passage into the camera in a superposed condition, the sheets are stripped apart and the photosensitive sheet positioned for exposure during movement into the camera. Following exposure of the photosensitive sheet, the sheets are withdrawn from the camera and during withdrawal are again superposed, the container is ruptured and its fluid contents are discharged therefrom and spread in a layer between the sheets to form a sandwich. The fluid-spreading device is associated with the passage in the camera through which the sheets are introduced and withdrawn and must be so constructed as to permit the introduction and movement of the sheets into the camera with the fluid container in an unruptured condition.

Accordingly, it is another object of the invention to provide a novel fluid-spreading device of the above type associated with a passage and which permits the movement of a pair of superposed sheets through said passage in one direction without causing rupture of a fluid-filled container secured between the sheets and automatically functions to rupture the container and spread its fluid contents in a thin layer between the sheets during movement of the sheets through the passage in the opposite direction.

A further object of the invention is to provide a fluid-spreading device of the above type in association with a passage adapted to aid in preventing the admission of light through said passage.

The fluid-spreading device of the invention may also be incorporated in photographic apparatus such as a camera wherein successive frames of a photosensitive sheet are exposed and moved into superposition with successive areas of a second sheet and a fluid is spread from a container associated with each area in a layer between each superposed frame and area.

Accordingly it is still another object of the invention to provide a fluid-spreading device of the above type adapted to arrest the movement of sheet materials through photographic apparatus with which it is associated, and which is capable of being reset to permit the continued movement of said sheets.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Generally the device of the invention is adapted to the spreading of a fluid in a uniformly thin layer between a pair of superposed sheets to form a sandwich. The device comprises a pair of rigid members spaced apart to provide a gap of fixed width through which the sheets are moved for distributing the fluid therebetween. The fluid is preferably carried in a rupturable container secured to one of the sheets between the sheets adjacent the area thereof over which the fluid is to be spread. The overall thickness of the fluid-filled container is substantially greater than the combined thicknesses of the two sheets, while the thickness of the sheet material comprising the container is greater than the thickness of the layer of fluid to be distributed between the sheets. The gap formed by the rigid members for spreading the fluid is of a width insufficient to permit the movement of the container in either a ruptured or unruptured condition through the gap between the rigid members and accordingly the device comprises means for positioning the rigid members with respect to one another so as to provide a gap of fixed width adapted to cause the rupture of the container and the discharge of its fluid contents between the sheets as the container is moved through the gap, and thereafter substantially automatically adjust the relative positions of the rigid members to provide a gap of the first-mentioned width for spreading the fluid between the sheets over an area disposed immediately adjacent the container. The rigid members are movable to still another position wherein the gap between them is of a width sufficient to allow movement of the container in an unruptured condition.

Reference is now made to Figs. 1 through 5 of the drawings wherein there is shown the fluid-spreading device of the invention embodied in one form of photographic apparatus such as a camera. The camera comprises a housing mounting means, such as a lens and shutter, for photoexposing light-sensitive material, and includes a rear wall 10, an oblique side wall 14 and a passage 16 at the juncture of the two walls. The camera is adapted to be employed with a film unit of the type indicated at 18 and comprising a photosensitive sheet 20 and a second sheet 22. The film unit is adapted to be introduced into the camera through passage 16 and the two sheets are separated, photosensitive sheet 20 being guided into position for exposure and second sheet 22 being retained apart from photosensitive sheet 20 during exposure of the latter. As a means for separating the sheets as they are introduced into the camera, retaining them apart from one another and positioning the photosensitive sheet for exposure, the camera comprises an inner rear wall 24 disposed adjacent rear wall 10 and having a rear surface so located as to properly position a photosensitive sheet disposed against said surface for exposure, and an inner oblique side wall 26 located adjacent side wall 14 and forming, in conjunction therewith, a chamber 28 within which second sheet 22 is retained apart from the photosensitive sheet during exposure of the latter. Inner walls 24 and 26 are joined at a wedge-shaped section 30 having an edge extending into passage 16. Section 30 is so positioned as to extend between the sheets of a film unit, as the latter is moved through the passage, for separating the sheets and for guiding the photosensitive sheet into position for exposure and the second sheet into chamber 28. Inner rear wall 24 is provided with an aperture 32 for transmitting light from the exposure means to photosensitive sheet 20 positioned for exposure against the rear surface of said wall.

Figure 1:
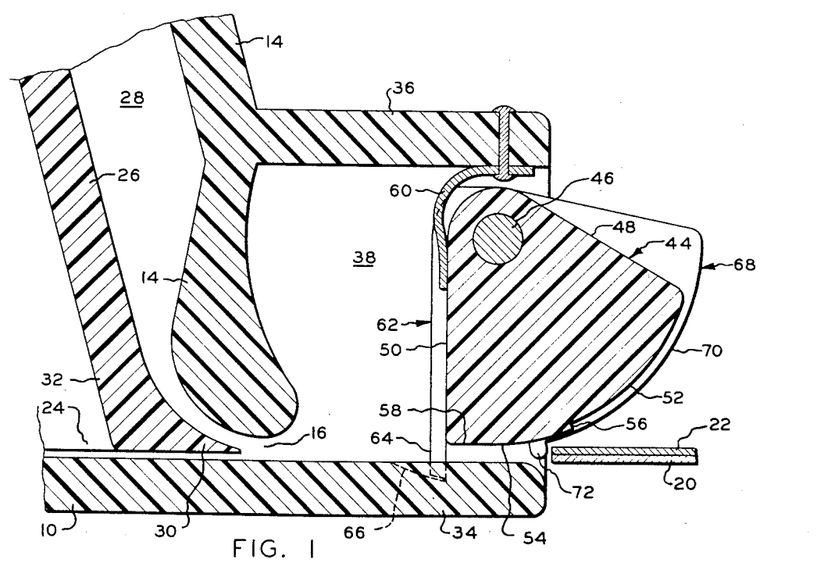
Figure 1 is a cross-sectional side elevational view showing the fluid-spreading device of the invention incorporated in a camera.
Figure 2:
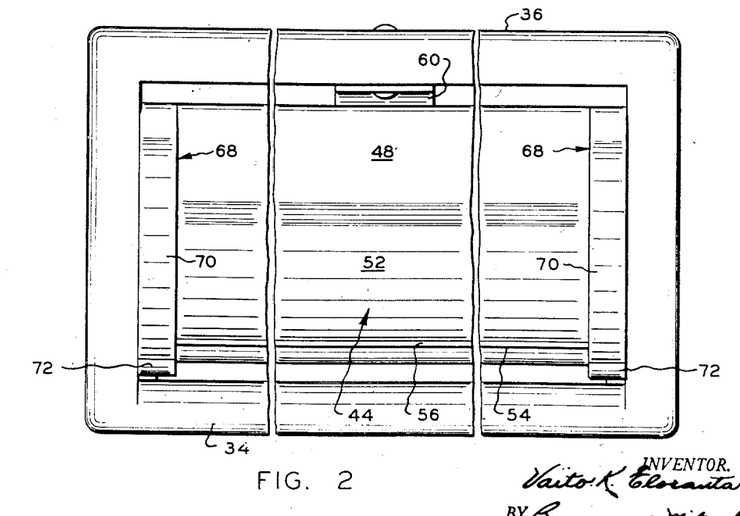
Fig. 2 is an end elevational view of the device of Fig. 1.
Figure 3:
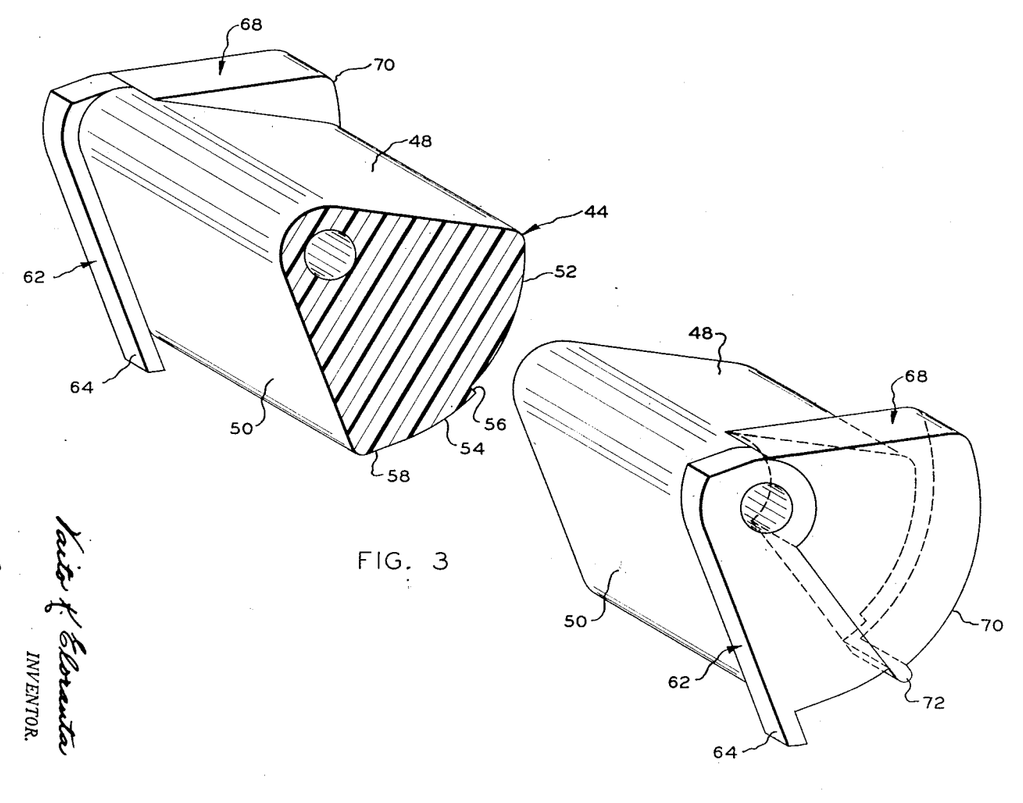
Fig. 3 is a perspective view, partially in section, of the fluid-spreading device of Fig. 1.

As a means for mounting the herein-disclosed fluid-spreading device in association with passage 16 and for preventing the admission of light into said passage, rear wall 10 is provided with a section 34 extended beyond passage 16 and the side wall is provided with projecting wall sections including a forward wall section 36 and two side wall sections 38 forming, in conjunction with extended section 34, a generally rectangular, enlarged passage or chamber extending from passage 16 and open at one end.

Photosensitive sheet 20 of the film unit in the form shown preferably comprises a stratum of photosensitive material, for example an emulsion of a heavy metal salt such as a silver halide, in which a latent image may be attained by differential exposure to actinic light, and a suitable support or backing for the photosensitive stratum. The second sheet 22 is preferably adapted to serve as, or support, an image-receiving stratum. The film unit includes a rupturable container 40 secured to second sheet 22 and carrying a fluid for processing the photosensitive stratum and preferably adapted, when spread between the photosensitive and second sheets, to form a sandwich for effecting a silver halide diffusion transfer-reversal process by which a latent image in the photosensitive sheet is developed and a positive print is produced in the sandwich on the second sheet. Examples of photographic materials useful in processes of the foregoing type are described in detail in Patent No. 2,543,181, issued to Edwin H. Land on February 27, 1951.

Film unit 18 is adapted to be introduced into the camera through passage 16 with sheets 20 and 22 in a superposed condition and, following exposure of the photosensitive sheet within the camera, to be withdrawn therefrom through the passage. It is during withdrawal from the camera that the processing fluid is spread between the superposed sheets to form a sandwich within which a positive image is formed. The two sheets comprising the sandwich are maintained in superposition for a predetermined processing period following withdrawal from the camera and at the end of which the second sheet carrying a positive photographic print may be stripped from the photosensitive sheet. To prevent exposure of the photosensitive sheet prior to its introduction into the camera and during the processing period following withdrawal from the camera, sheets 20 and 22 are provided with an outer coating opaque to actinic light or are formed of a sheet material which is opaque to actinic light. The two sheets are initially secured together at least at their margins by an adhesive which permits their being stripped apart when advanced against wedge-shaped section 30 in passage 16. As the sheets are superposed during withdrawal from the camera, the layer of processing fluid spread between the sheets serves to adhere them together and the fluid may include a suitable dye or other substance rendering it opaque to actinic light and thereby preventing light from leaking between the margins of the sheets and exposing the photosensitive sheet.

Container 40 is of the type disclosed in the aforementioned Land Patent No. 2,543,181 and comprises a rectangular section of sheet material folded lengthwise to form two walls sealed in facing relation at their margins and defining an elongated fluid-carrying cavity. The longitudinal edge seal of the container is weaker than the end seals and is adapted to become unsealed to allow the discharge of its fluid contents, indicated at 42, when compressive pressure is applied to the container. The container is secured to second sheet 22 with the longitudinal edge seal facing the area of the sheet over which fluid 42 is to be distributed so that the fluid is discharged from the container between the areas of the two sheets over which it is to be spread.

The fluid-spreading device of the invention provides a gap of two substantially fixed widths through which the superposed sheets are advanced for causing the discharge of a fluid from a container and for spreading the fluid between the sheets. This gap is defined on one side by the forward surface of extended section 34 of rear wall 10 and on the opposite side by a rigid member generally indicated at 44. Rigid member 44, in cross section, is the shape of substantially a sector of a circle and is mounted for pivotal movement on a shaft 46 running longitudinally through member 44 at approximately the center of said circle and journaled at its ends in side walls 38. Rigid member 44 includes a pair of generally flat surfaces 48 and 50 extending from end to end and when viewed in cross section corresponding to the radii of the above-mentioned sector of a circle. The third or curved side of rigid member 44 corresponding to the arc of the sector of a circle comprises two curved surface sections, the first curved surface section, indicated at 52, adjoining flat surface 48 and having as a center the axis of shaft 46, and a second curved surface section, indicated at 54, having a greater radius than section 52. Curved surface sections 52 and 54 join one another at a relatively abrupt shoulder or ridge 56, the purpose of which will be described hereinafter. Second curved surface section 54 blends into a short flat surface section 58 which is tangent thereto and forms a generally right-angle corner with flat surface 50.

Rigid member 44 is pivotally mounted within the open chamber formed by extended wall section 34 and forward and side wall sections 36 and 38, shaft 46 being journaled in wall sections 38 adjacent forward wall section 36 so that the rigid member acts as a closure for the chamber and is pivotable therein with curved surface sections 52 and 54 disposed adjacent extended wall section 34 and with flat surface 48 outermost. Rigid member 44 is illustrated in Fig. 1 in a closed or fluid-spreading position with second curved surface section 54 and flat surface section 58 disposed adjacent extended wall section 34, surface 58 being substantially parallel to the forward surface of wall section 34 and defining, in conjunction therewith, a gap or passage adapted to effect the spreading of fluid 42 in a thin layer between the sheets. For this purpose, the rigid member is so constructed that this gap is slightly greater, depending on the desired thickness of the layer of fluid, than the combined thickness of the two sheets between which the fluid is to be spread.

Rigid member 44 is resiliently urged into the aforementioned closed or spreading position by suitable spring means, for example a torsion spring associated with shaft 46 or, as in the form shown, an L-shaped spring 60 secured to forward wall section 36. To prevent pivotal movement (in a counterclockwise direction viewing the drawings) of the rigid member past this position under the bias of spring 60 or during withdrawal of a pair of sheets from the camera through passage 16, there is provided in the form shown in Figs. 1 and 2 a pair of ribs 62 raised from flat surface 50 and having end sections 64 projecting beyond flat surface section 58. End sections 64 are adapted to project into recesses 66 formed in the forward surface of extended wall section 34 and abut against sides of the recess. Ribs 62 and their extended end sections 64 are spaced apart sufficiently to allow the passage of the sheets between the end sections.

Figure 4:
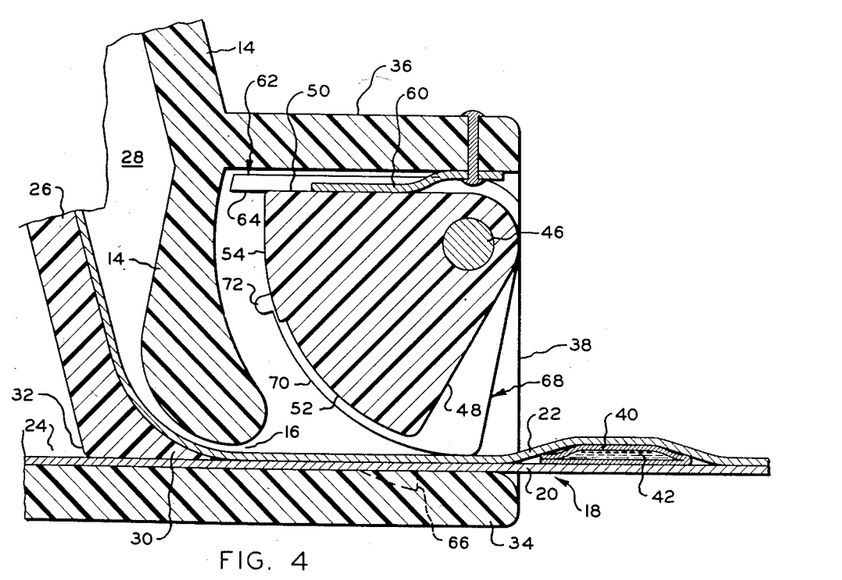
Figs. 4 and 5 are views similar to Fig. 1 showing the fluid-spreading device in successive positions for illustrating its operation.

Rigid member 44 is pivotable (in a clockwise direction) from the aforementioned closed or fluid-spreading position (shown in Fig. 1) to an open position shown in Fig. 4 to provide a gap between extended wall section 34 and the juncture of flat surface 48 and first curved surface section 52 sufficient to permit the introduction and movement of a a film unit 18 into the camera without rupturing container 40; that is, to define a gap of a width which is greater than the combined thickness of sheets 20 and 22 and the unruptured fluid-filled container. Means are provided on rigid member 44 for engaging the sheets of a film unit as they are introduced into the camera for pivoting the member in a clockwise direction to the aforementioned open position. In the form shown, this means comprises a pair of engagement members 68 secured to the ends of rigid member 44 and providing a pair of tires or raised shoulders 70 at the ends of first curved surface section 52. Engagement members 68 are formed of a deformable friction-generating material, such as rubber, and shoulders 70 extend from raised ridge 56 substantially parallel with surface section 52 around the corner formed by the juncture of section 52 and flat surface 48. Each shoulder is provided with a short radial projection 72 located adjacent ridge 56 and adapted to be engaged by the leading end of the film unit to insure pivotal movement of rigid member 44 as the film unit is introduced between the rigid member and extended wall section 34. As a film unit is introduced into the camera between member 44 and extended wall section 34, shoulders 70 are compressed into frictional engagement with the margins of the film unit and insure rotation of rigid member 44 to the aforementioned open position, at which shoulders 70 are retained in engagement with sheet 22 because of the bias of spring 60, but ride freely on the margins of the sheet, allowing container 40 to pass between the shoulders and between rigid member 44 and extended wall section 34.

Film unit 18 is introduced and moved through the passage between extended wall section 34 and rigid member 44, causing pivotal movement of the latter until container 40 comes to rest with its leading (folded) edge substantially underlying the corner of member 44 formed by the juncture of flat surface 48 and curved surface section 52. As the film unit is introduced, sheet 22 is stripped from sheet 20 so that when introductory movement of the film unit is arrested with the container in the above-described position, photosensitive sheet 20 is in position for exposure. When it is desired, following exposure, to process the film unit by spreading fluid 42 in a thin layer between the sheets, the film unit need only be drawn from the camera, rigid member 44 automatically functioning to cause the discharge of the fluid from the container and spreading of the fluid in a layer of the proper thickness between the sheets.

As film unit 18 is withdrawn (to the right viewing the drawings) from the camera, shoulder 70, urged into contact with sheet 22 under the bias of spring 60, is again compressed in frictional engagement with the margins of sheet 22, causing the counterclockwise rotation of rigid member 44. The radius of first curved surface section 52 is uniform and is such that the gap between surface section 52 and extended wall section 34 is substantially equal to the combined thickness of sheets 20 and 22 and the thickness of the sheet material comprising the walls of container 40. By virtue of this arrangement and the positioning of the container just prior to withdrawal of the film unit from the camera, first curved surface section 52 is brought into rolling contact with the film unit in the region of the container, compressing the container progressively from its leading end toward its discharge mouth so as to cause complete discharge of its fluid contents. First curved surface section 52 in effect forms, in conjunction with extended wall section 34, a fixed gap just wide enough to admit the film unit in the region of the container when the latter is in a collapsed condition.

Figure 5:
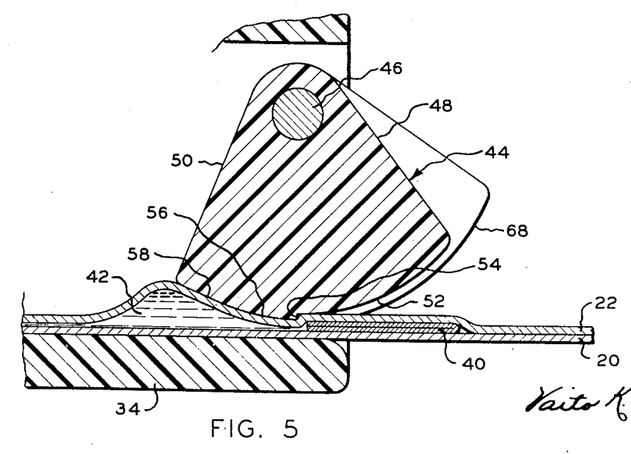

As withdrawal movement of film unit 18 and counterclockwise pivotal movement of rigid member 44 are continued, second curved surface section 54 and flat surface section 58 are brought into engagement with the sheets and define, in conjunction with extended wall section 34, a second gap of fixed width for spreading the fluid in a thin layer between the sheets. The circumferential length of first curved surface section 52 is substantially equal to the width of a collapsed container so that as the rigid member rotates with surface 52 in engagement with the film unit in the region of the container, ridge 56 is moved into engagement with the film unit substantially in alignment with the trailing edge of the container, Fig. 5 illustrating rigid member 44 in this last-described position. Ridge 56, defining the abrupt change of the pressure-applying surface of rigid member 44 from surface section 52 to surface section 54, having a greater radius, insures the complete spreading of fluid 42 in a uniformly thin layer of the proper thickness commencing immediately at the trailing edge of the container.

Figure 6:
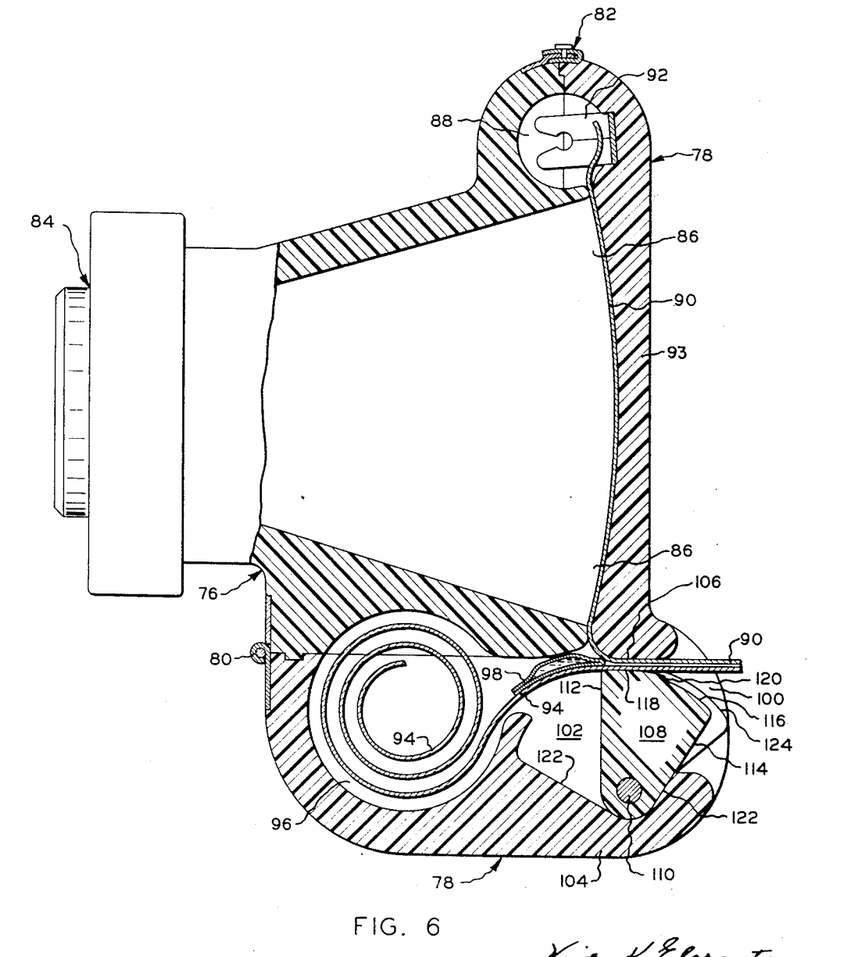
Fig. 6 is an elevational view, partially in section, of another form of camera embodying the fluid-spreading device of the invention illustrating its operation for arresting the movement of sheet materials.

Reference is now made to Fig. 6 of the drawings wherein the fluid-spreading device is shown embodied in another type of camera and the device functions to arrest the movement of sheet materials, and the drawing showing the general relation of components of the camera to the sheet materials employed therein. The camera comprises a forward housing section 76 and a rear housing section 78 pivotally mounted with respect to one another by a hinge 80 with a latch 82 being provided at the end of the camera opposite the hinge for holding the two housing sections in closed position. Pivotal mounting of the two housing sections permits ready access therewithin for loading and threading the sheet materials used in the camera. The camera includes a lens and shutter assembly 84 of conventional design mounted on a tapered portion of the forward housing section 76 which provides an optical path between the lens of assembly 84 and a photosensitive sheet positioned within the camera for exposure. A pair of laterally spaced guide tracks 86 are provided at the rear of housing section 76 for supporting frames of a photosensitive sheet at their margins in position for exposure to light transmitted by the lens of assembly 84.

The ends of the housing sections adjacent latch 82 are so constructed as to form a generally cylindrical chamber 88 in which is mounted a supply of photosensitive sheet material 90 coiled on a conventional spool (not shown). The spool may include a pair of stub shafts at its ends adapted to be pivotally mounted between the arms of a U-shaped bracket 92 secured within chamber 88 to rear housing section 78. Photosensitive sheet 90 is threaded from chamber 88 across guide tracks 86 where it is supported in position for exposure. The interior surface of rear wall 93 of rear housing section 78 is curved to conform to the curvature of guide tracks 86 and substantially to the focal surface of the lens of assembly 84 so as to retain photosensitive sheet 90 against the tracks in position for exposure when the two housing sections are in closed position. A supply of a second sheet 94 is provided in a preferably loose roll housed in a generally cylindrical chamber 96 formed by portions of housing sections 76 and 78 in the vicinity of hinge 80 at the end of the camera opposite chamber 88. The second sheet is adapted to be superposed with the exposed photosensitive sheet and the superposed sheets advanced through the device for spreading a processing fluid in a thin layer between the sheets to form a sandwich. The processing fluid is carried, for example, in a succession of elongated rupturable containers 98 secured transversely at regular intervals preferably to second sheet 94, one container being associated with an image-receiving area of the sheet. It is apparent that the container construction results in an increased thickness of the sheet materials in the region of the container over the thickness of the sheets in the region between successive containers and it is this variation in the thickness of the materials which must pass through the spreading device which is utilized for arresting the movement of the sheets.

A passage, generally indicated at 100, is provided at the rear of housing section 78 in the region where photosensitive sheet 90 and second sheet 94 are advanced into superposition with one another. Passage 100 is adapted to house a fluid-spreading device similar in structure and function to the above-described device and is defined by side walls 102, end wall 104 and an enlarged section 106 of rear wall 93. The fluid-spreading gap of the device is defined on one side by a substantially flat inner surface portion of enlarged section 106 and on the opposite side by a rigid member 108 similar in structure and function to the hereinbefore described rigid member 44. Rigid member 108 in cross section appears substantially as the sector of a circle and is pivotally mounted within passage 100 on a shaft 110 journaled in side walls 102 adjacent bottom wall 104. Rigid member 108 includes a pair of generally flat surfaces 112 and 114 extending from end to end thereof and corresponding, when viewed in cross section, substantially to the radii defining a sector of a circle.

The third or curved surface of rigid member 108, corresponding to the arc of the sector of a circle, comprises two curved surface sections extending substantially the full length of the member. A first curved surface section 116 has as its center of curvature the axis of shaft 110 and forms a corner with flat surface section 114, and a second curved surface section 118, having a greater radius than curved surface section 116, joins section 116 at an abrupt shoulder 120. Second curved surface section 118 may blend into a short flat surface section extending the full length of the rigid member and/or forms a substantially right angle corner with flat surface section 112.

The inner surface portion of bottom wall 104 is formed with a generally V-shaped recess and rigid member 108 is pivotally mounted within passage 100 on shaft 110 journaled adjacent the apex of this recess so that the rigid member extends across and forms a closure for the passage. The surface of the V-shaped recess is indicated at 122 and is adapted to engage flat surfaces 112 and 114 of the rigid member for limiting its pivotal movement, for example to approximately 60°, and thereby define two predetermined positions of the rigid member.

Rigid member 108 is illustrated in Fig. 6 in a closed or fluid-spreading position wherein curved surface section 118 is located adjacent the rear surface of enlarged section 106 and defines, in conjunction therewith, a gap or passage adapted to effect the spreading of fluid between the sheets and to arrest movement of the sheets when a container 98, located between the sheets, enters this gap. Rigid member 108 is pivotable from the closed or fluid-spreading position in a counterclockwise direction (viewing Fig. 6) to an open position wherein the juncture or corner of flat surface 114 and first curved surface section 116 is located adjacent the flat surface of enlarged section 106 to provide a gap through which the sheets in the region of a container located therebetween are movable. Thus, to permit the continued advancement of the sheets following arrestment of their movement, rigid member 108 is pivoted in a counterclockwise direction from its closed to its open position and for this purpose shaft 110 preferably extends completely through one of side walls 102 and has attached to its end suitable manually engageable means, such as a handle or crank, for pivoting the shaft in a counterclockwise direction.

Means are provided at the ends of rigid member 108 for engaging the sheet materials as they are withdrawn from the camera so as to pivot said member in a clockwise direction from its open to its closed or fluid-spreading position. It is during this pivotal movement that curved surface section 116 engages sheet 94 in the region of a container for compressing the container and causing its fluid contents to be discharged therefrom between the sheets. The aforementioned means for engaging the sheets comprises a pair of curved tires or raised shoulders 124 at the ends of curved surface section 116 and extending radially beyond said section. Shoulders 124 are formed of a deformable friction-generating material, such as rubber, and engage sheet 94 at its margins so as to insure pivotal counterclockwise movement of the rigid member as the sheets are withdrawn from the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for spreading a fluid in a thin layer between a pair of superposed sheets, said fluid being provided in a rupturable container located between said sheets adjacent the area thereof over which said fluid is spread, said apparatus comprising, in combination, a fixed member having a substantially straight surface for defining one side of a pressure-applying gap, a rigid member so mounted with respect to said fixed member as to provide a gap therebetween through which a pair of superposed sheets are movable, said rigid member being mounted for movement with respect to said fixed member in response to movement of said sheets through said gap in frictional engagement with said rigid member, said rigid member having a first surface section and a first position wherein said first surface section cooperates with said straight surface to provide a gap of predetermined width through which a rupturable container located between said pair of sheets may be advanced for causing the discharge of the fluid contents of said container, said rigid member having a second surface section and a second position wherein said second surface section cooperates with said straight surface to provide a gap, of a width predeterminedly less than the first mentioned width, through which said sheets may be advanced for spreading said fluid in a thin layer therebetween.

2. The photographic apparatus of claim 1 wherein resilient means are provided for urging said rigid member into said second position.

3. The photographic apparatus of claim 1 wherein said rigid member has a third position and manually engageable means are provided for moving said rigid member from said second position through said first position to said third position.

4. The photographic apparatus of claim 1 wherein said rigid member is provided with projecting members of a deformable friction-generating material located in engagement with the margins of one of said sheets.

5. The photographic apparatus of claim 1 wherein said rigid closure member has a generally sector-shaped cross section and said first and second surface sections extend substantially the full length of said rigid member and correspond generally to the arc of the sector, said first and second surface sections have a common center of curvature at the pivotal axis of said rigid member and the radius of curvature of said first surface section is less than the radius of curvature of said second surface section.

6. In photographic apparatus including a passage through which is movable, a pair of superposed photographic sheets and a rupturable fluid-filled container located between said sheets, a rigid closure member pivotally mounted within said passage, said closure member cooperating with a wall of said passage to provide a gap through which a pair of superposed sheets are movable in frictional engagement with said closure member, said rigid member having a first section and a first position wherein said first section cooperates with said wall to provide a gap of predetermined width through which said superposed sheets are moved for spreading a fluid in a thin layer between said sheets, and a second section and a second position wherein said second section cooperates with said wall for providing a gap, of a width predeterminedly greater than the first-mentioned width, through which a rupturable container located between said sheets may be advanced for causing the discharge of the fluid contents of said container, said rigid member being pivotable from one position to another in response to frictional engagement with said moving sheets.

7. Photographic apparatus for spreading a fluid in a thin layer between a pair of superposed photographic sheets, said fluid being provided in a rupturable container located between said sheets adjacent the area thereof over which said fluid is spread, said apparatus comprising, in combination, a fixed pressure-applying member, a second pressure-applying member mounted in juxtaposition with said fixed pressure-applying member and defining in conjunction therewith a gap through which a pair of superposed sheets are movable in frictional engagement with said fixed pressure-applying member, and means mounting said second pressure-applying member for pivotal movement toward and away from said fixed pressure-applying member in response to frictional engagement with said moving sheets, said second pressure-applying member being mounted for movement between a first position wherein said gap is of sufficient width to allow the movement of a container located between said sheets between said members in an unruptured condition, and a second position wherein said pressure-applying members engage the moving sheets to spread said fluid in a thin layer therebetween, through an intermediate position wherein said gap between said pressure-applying members is greater than the width of the gap at said second position and less than the width of the gap at said first position, said second pressure-applying member at said intermediate position being adapted to engage said sheets in the region of said container for compressing said container and causing the discharge of its fluid contents.

8. The photographic apparatus of claim 7 wherein said second pressure-applying member is pivoted from said second position through said intermediate position to said first position in response to frictional engagement with said sheets moving in one direction and is pivoted from said first position through said intermediate position to said second position in response to frictional engagement with said sheets moving in the opposite direction.

9. The photographic apparatus of claim 7 including resilient means for urging the pivotal movement of said second pressure-applying member into said second position, and wherein said second pressure-applying member is pivotable against the bias of said resilient means from said second position through said intermediate position to said first position in response to frictional engagement with said moving sheets.

10. The photographic apparatus of claim 7 including manually engageable means for pivoting said second pressure-applying member from said second position through said intermediate position to said first position, and wherein said second pressure-applying member is pivotable from said first position through said intermediate position to said second position in response to frictional engagement with said moving sheets.

11. The photographic apparatus of claim 7 wherein said rigid member is provided with projecting members of a deformable friction-generating material positioned for engagement with the margins of one of said sheets.

12. The photographic apparatus of claim 7 wherein said rigid closure member has a generally sector-shaped cross section and longitudinal first and second surface sections corresponding to the arc of a sector, said first and second surface sections have a common center of curvature at the pivotal axis of said rigid member and the radius of curvature of said first surface section is less than the radius of curvature of said second surface section.

13. In photographic apparatus including a passage through which are moved a pair of superposed photographic sheets with a fluid-filled container located between said sheets, a rigid closure member pivotally mounted within said passage and cooperating with a wall of said passage for providing a gap through which said sheets are moved in frictional engagement with said rigid member, said rigid member being pivotable between a first position wherein it cooperates with said wall to define a gap of predetermined width through which said fluid-filled container located between said superposed sheets can be advanced for compressing said container and causing its fluid contents to be discharged between said sheets, and a second position wherein said rigid member cooperates with said wall to define a gap, of a width predeterminedly less than the first-mentioned width, through which said sheets are movable for spreading said fluid in a thin layer therebetween, said rigid member being pivotable from one position to the other in response to frictional engagement with said moving sheets.

14. The apparatus of claim 13 wherein said rigid closure member is pivotable to a third position wherein it cooperates with said wall to define a gap through which said sheets and said container are movable with said container in an unruptured condition, said rigid member being pivotable to said third position in response to frictional engagement with said moving sheets.

15. In photographic apparatus including a passage through which are moved a pair of superposed photographic sheets with a rupturable fluid-filled container located between said sheets, a rigid member mounted within said passage for movement with respect to a wall of said passage and cooperating with said wall of said passage to define a gap through which said sheets are movable in frictional engagement with said rigid member, said rigid member having a first position wherein it defines a gap of predetermined width through which said sheets are movable for spreading a fluid in a thin layer therebetween, said rigid member being movable in response to movement of said sheets in one direction to a second position wherein it cooperates with said wall to define a gap of predeterminedly greater width through which said sheets are movable with said container in an unruptured condition, said rigid member being movable in response to movement of said sheets in the opposite direction to a third position wherein it cooperates with said wall to define a gap, of a width predeterminedly less than the width of said gap when said rigid member is in said second position and greater than the width of said gap when said rigid member is in said first position, through which said fluid-filled container located between said superposed sheets can be advanced for compressing said container and causing its liquid contents to be discharged between said sheets, said rigid member being movable in response to movement of said sheets in said other direction from said second position to said first position.

16. In photographic apparatus including a passage through which are moved a pair of superposed photographic sheets with a fluid-filled container located between said sheets, a rigid closure member pivotally mounted within said passage and cooperating with a wall of said passage for providing a gap through which said sheets are moved in frictional engagement with said rigid member, said rigid member having a first surface section and a first position wherein said first surface section cooperates with said wall of said passage to define a gap of predetermined width through which a rupturable fluid-filled container located between a pair of superposed sheets can be advanced for compressing said container and causing its liquid contents to be discharged between said sheets, and a second surface section and a second position wherein said second surface section cooperates with said wall to define a gap, of a width predeterminedly less than the width of the gap at said first position of said rigid member, through which said sheets are movable for spreading said fluid in a thin layer therebetween, said rigid member being pivotable from one position to another in response to frictional engagement with said moving sheets.

17. Photographic apparatus for spreading a fluid in a thin layer between a pair of superposed sheets, said fluid being provided in a rupturable container located between said sheets adjacent the area thereof over which said fluid is spread, said apparatus comprising, in combination, a fixed member having a substantially straight surface for defining one side of a pressure-applying gap, a rigid member so mounted with respect to said fixed member as to provide a gap therebetween through which a pair of superposed sheets are movable in frictional engagement with said rigid member, said rigid member being mounted for pivotal movement with respect to said fixed member in response to movement of said sheets through said gap in frictional engagement with said rigid member, said rigid member having a first position wherein it cooperates with said straight surface of said fixed member to define a gap of predetermined width through which said sheets may be moved for spreading said fluid in a layer therebetween, said rigid member being pivotable from said first position to a second position wherein it cooperates with said fixed member to provide a gap through which said sheets and a rupturable container are movable with said container in an unruptured condition, said rigid member being pivotable from said second position to said first position through an intermediate position wherein said rigid member cooperates with said straight surface of said fixed member to provide a gap, of a width predeterminedly greater than the gap at said first position and less than said gap at said second position, through which said container located between said superposed sheets may be advanced for causing the discharge of the fluid contents of said container.

18. The photographic apparatus of claim 17 wherein said rigid member is pivoted from said first position to said second position in response to frictional engagement with said sheets moving in one direction, and is pivotable from said second position through said intermediate position to said first position in response to frictional engagement with said sheets moving in the opposite direction.

19. In photographic apparatus for exposing photosensitive sheet material, means associated with a passage in said apparatus for spreading a fluid in a thin layer between a photosensitive sheet and another sheet superposed therewith during withdrawal of said sheets from said apparatus, said fluid being provided in a rupturable container located between said sheets adjacent the area thereof over which said fluid is spread, said means comprising, in combination, a fixed member having a substantially straight surface for defining one side of a pressure-applying gap, a rigid member so mounted with respect to said fixed member as to define the other side of said gap through which a pair of sheets are movable in frictional engagement with said rigid member, and means mounting said rigid member for pivotal movement with respect to said fixed member in response to movement of said sheets through said gap in frictional engagement with said rigid member, said rigid member having a first surface section and a first position wherein said first surface section cooperates with said straight surface to define a gap of predetermined width through which said sheets are movable for spreading said fluid in a thin layer therebetween, said rigid member being pivotable from said first position to a second position wherein said gap provided by said rigid member and said fixed member is of sufficient width to permit the movement of a container located between said sheets in an unruptured condition, said rigid member having a second surface section and an intermediate position wherein said second surface section cooperates with said straight surface to define a gap, of a width predeterminedly greater than the gap at said first position and less than said gap at said second position, through which said container located between said superposed sheets may be advanced for causing the discharge of the fluid contents of said container, said rigid member being pivotable from said second position through said intermediate position to said first position in response to frictional engagement with said sheets during withdrawal movement thereof from said apparatus.

20. The photographic apparatus of claim 19 wherein said rigid member is pivoted from said first position to said second position in response to frictional engagement with said sheets during introductory movement of said sheets through said passage and said gap into said apparatus.

21. In photographic apparatus including a passage through which a photographic film unit comprising a pair of superposed sheets and a rupturable fluid-filled container located between said sheets is introduced into and removed from said apparatus, closure means associated with said passage for allowing the introduction of said film unit into said apparatus with the container of said film unit in an unruptured condition and for spreading the fluid contents of said container between said sheets during withdrawal of said film unit from said apparatus, said means comprising a rigid member so mounted within said passage for movement with respect to the walls of said passage as to permit the movement of a film unit in frictional engagement with said rigid member between the latter and said wall of said passage, said rigid member having a first surface section and a first position wherein said rigid member closes said passage and said first surface section cooperates with said wall of said passage to provide a gap of predetermined width through which the superposed sheets of a film unit may be advanced for spreading a fluid in a thin layer between said sheets, said rigid member having a second surface section and a second position wherein said second surface section cooperates with said wall for providing a gap, of a width predeterminedly greater than the first-mentioned width, through which a rupturable container located between said sheets may be advanced for causing the discharge of the fluid contents of said container, said rigid member having a third position wherein the gap between said rigid member and said wall is wide enough to permit the movement of a film unit through said passage with the container thereof in an unruptured condition, said rigid member being movable from one position to another in response to frictional engagement with said moving film unit.

No references cited.